(12) United States Patent
Dupont et al.

(10) Patent No.: US 9,458,362 B2
(45) Date of Patent: Oct. 4, 2016

(54) ADHESIVE COMPOSITIONS CONTAINING A BLOCK COPOLYMER WITH POLYMYRCENE

(71) Applicant: KRATON POLYMERS U.S. LLC, Houston, TX (US)

(72) Inventors: Martine Dupont, Brussels (BE); Marianne Stol, Haarlem (NL)

(73) Assignee: Kraton Polymers U.S. LLC, Houston, TX (US)

(*) Notice: Subject to any disclaimer, the term of this patent is extended or adjusted under 35 U.S.C. 154(b) by 0 days.

(21) Appl. No.: 14/243,066

(22) Filed: Apr. 2, 2014

(65) Prior Publication Data

US 2015/0284605 A1    Oct. 8, 2015

(51) Int. Cl.
*C08F 293/00* (2006.01)
*C09J 153/02* (2006.01)
*C08F 236/22* (2006.01)
*C08F 297/02* (2006.01)
*C09J 153/00* (2006.01)

(52) U.S. Cl.
CPC ............ *C09J 153/02* (2013.01); *C08F 236/22* (2013.01); *C08F 293/00* (2013.01); *C08F 297/023* (2013.01); *C09J 153/00* (2013.01)

(58) Field of Classification Search
CPC   C08F 297/04; C08F 297/044; C08F 293/00; C08F 293/05; C09J 153/02
See application file for complete search history.

(56) References Cited

U.S. PATENT DOCUMENTS

| | | | |
|---|---|---|---|
| 2,383,084 | A | 8/1945 | Rummelsburg |
| 2,549,539 | A | 4/1951 | Westfield et al. |
| 2,829,065 | A | 4/1958 | Gleason et al. |
| RE27,145 | E | 6/1971 | Jones |
| 3,706,817 | A | 12/1972 | Wald et al. |
| 3,985,830 | A | 10/1976 | Fetters et al. |
| 4,039,593 | A | 8/1977 | Kamienski et al. |
| 4,374,957 | A | 2/1983 | Quirk |
| 4,391,949 | A | 7/1983 | St. Clair |
| 4,444,953 | A | 4/1984 | St. Clair |
| 4,780,367 | A * | 10/1988 | Lau et al. ............... 428/355 BL |
| 5,364,723 | A | 11/1994 | Georges et al. |
| 5,399,627 | A | 3/1995 | Diehl et al. |
| 5,759,569 | A | 6/1998 | Hird et al. |
| 6,291,107 | B1 | 9/2001 | Shimizu |
| 7,307,124 | B2 | 12/2007 | Dubois |
| 2001/0047055 | A1 | 11/2001 | Takeuchi et al. |
| 2004/0186215 | A1* | 9/2004 | Lewtas ................ C08F 255/00 524/487 |
| 2004/0219322 | A1 | 11/2004 | Fisher et al. |
| 2005/0186379 | A1 | 8/2005 | Rhee et al. |
| 2007/0105986 | A1 | 5/2007 | Kluttz et al. |
| 2010/0015442 | A1 | 1/2010 | Shimoura et al. |
| 2010/0087559 | A1 | 4/2010 | Kusanose et al. |
| 2012/0010367 | A1 | 1/2012 | Prunarely et al. |
| 2012/0128833 | A1 | 5/2012 | Patel et al. |
| 2012/0248002 | A1 | 10/2012 | Sun et al. |

FOREIGN PATENT DOCUMENTS

| | | |
|---|---|---|
| CA | 716645 A | 8/1995 |
| EP | 2860198 A1 | 4/2015 |
| FR | 2875448 A1 | 12/2013 |
| GB | 1145378 A | 4/1966 |
| WO | 0126620 A1 | 4/2001 |
| WO | 2010027463 A1 | 3/2010 |
| WO | 2010027464 A1 | 3/2010 |
| WO | 2010100651 A2 | 9/2010 |
| WO | 2012134454 A1 | 10/2012 |
| WO | 2013183570 A1 | 12/2013 |

OTHER PUBLICATIONS

Provder, T. ACS Symposium Series vol. 245: Size Exclusion Chromatography American Chemical Society (1984) pp. 295-320.*
Bolton, J.M., Hillmyer, M.A., Hoye, T.R.; Sustainable Thermoplastic Elastomers From Terpene-Derived Monomers, ACS Macro Lett. 2014, 3, 717-720.
Sivola, Arto; ACTA Polytechnica Scandinavica, Chemistry Including Metallurgy Series No. 134, Ch. 134, Helsinki 1977.
Raynaud, Jean; Wu, Jessica Y. and Ritter, Tobias, Iron-Catalyzed Polymerization of Isoprene and Other 1,3-Dienes, Iron Catalysis, Wiley-VCH Verlag GmbH & Co. KGaA, Weinheim, Agnew. Chem. Int. Ed. 2012, 51, 11805-11808.
Choi, Soowhan; Ritter, Helmut; Novel Polymerization of Myrcene in Aqueous Media via Cyclodextrin-Complexes, e-Polymers 2007, No. 045.
Trumbo, David, L., Free Radical Copolymerization Behavior of Myrcene—I. CopolymersWith Styrene, Methyl Methacrylate or p-Fluorostyrene, Polymer Bulletin, 31, 629-636 (1993).
Hsieh, H.L. and Quirk, R.P., Anionic Polymerization Principles and Practical Applications, Stereochemistry of Polymerization, Ch. 9, pp. 197-235, New York, NY, Marcel Dekker, 1996.
PCT/US2015/23842 International Search Report date Aug. 27, 2015.
PCT/US2015/23857 International Search Report dated Jun. 24, 2015.

* cited by examiner

*Primary Examiner* — Irina S Zemel
*Assistant Examiner* — Jeffrey Lenihan
(74) *Attorney, Agent, or Firm* — Katya Seysheva (57) ABSTRACT

The invention relates to a novel block copolymer comprising at least one polymeric monoalkenyl arene block and at least one polymeric myrcene block having a low and stable viscosity and having good adhesive properties when used in an adhesive composition or as a damping material. An adhesive composition is also described, preferably containing an SMS triblock optionally mixed with an SM diblock. The adhesive composition comprises: 1) a block copolymer having at least one polymeric monoalkenyl arene block and at least one polymeric myrcene block; 2) a tackifier; 3) optional plasticizer; and 4) optionally a stabilizer. Compared with adhesive compositions comprising SIS block copolymers, those comprising SMS block copolymers have lower and more stable viscosity.

4 Claims, 6 Drawing Sheets

ADHESIVE COMPOSITIONS CONTAINING A BLOCK COPOLYMER WITH POLYMYRCENE

FIELD OF THE INVENTION

The present invention relates to a novel block copolymer comprising a monoalkenyl arene and myrcene useful in an adhesive composition and having good vibration damping performance.

An adhesive composition is also described in the present invention, containing in one preferred embodiment a triblock copolymer of styrene-myrcene-styrene, as described above and optionally mixed with a diblock copolymer S-M, produced either by sequential polymerization or by coupling polymerization. The adhesive composition comprises: 1) a copolymer of monoalkenyl arene block polymer and myrcene block polymer; 2) a $C_5$, $C_9$, $C_5/C_9$, a modified or hydrogenated $C_5$, $C_5/C_9$ or $C_9$ hydrocarbon resin, terpenes, or rosin esters, rosin derivatives, or a mixture of two or more of these as a tackifier compatible with the novel block copolymer; 3) optional plasticizer such as mineral or naphthenic oil; and 4) optionally a stabilizer such as one or more antioxidants. The adhesive composition possesses a very stable hot-melt viscosity over time (such as 24 hours, at 160° C.). Compared with adhesive compositions comprising SIS block copolymers, those comprising SMS block copolymers of the present invention have lower and more stable hot-melt viscosity.

BACKGROUND

Currently the best performing styrenic block copolymer for hot-melt pressure sensitive adhesive applications is styrene-isoprene-styrene (see, U.S. Pat. No. 7,307,124). Another good styrenic block copolymer for hot-melt pressure sensitive adhesive is styrene-butadiene/isoprene-styrene where the midblock is a random mixture of butadiene and isoprene. These copolymers have the best performance because they have good adhesive properties, good tensile properties and acceptable hot-melt viscosity when modified with a tackifier.

The petro derived monomers like isoprene and butadiene suffer from price volatility and recurrent shortages. In this regard it is important to consider alternate bio-derived monomers which can help reduce the need for petro-derived monomers. One such class of alternates is terpenes which are naturally occurring products that include myrcene ($C_{10}H_{16}$). Terpenes such as myrcene can also be biosynthesized on an industrial scale from naturally occurring products.

U.S. Pat. No. 4,374,957 to Quirk discloses a linear triblock polymer of styrene-myrcene-styrene (SMS) made by sequential polymerization with an organolithium initiator. In that work it was noted that neat, non-formulated styrene-butadiene-styrene and styrene-isoprene-styrene block copolymers lacked the tackiness to make them useful as adhesives. Inventive SMS block copolymers were made. The polystyrene content of the examples ranged from 23 to 58 wt. % of the SMS block copolymer and the resulting tensile strengths ranged from 3.5 to 12.8 MPa. No formulated adhesive compositions were made from those block copolymers. Further, while it was qualitatively observed that the inventive polymers had increasing tackiness as the myrcene content increased, no adhesive properties were analytically measured on these non-formulated polymers and as such the polymers themselves were not evaluated as adhesives.

The need exists for styrenic block copolymers that have properties similar or superior to styrene-isoprene-styrene block copolymers especially when used in adhesive compositions. In particular there is a need for styrenic block copolymer with a low hot-melt viscosity and a melt flow rate that is superior to styrene-isoprene-styrene block copolymers to allow for a lower temperature application of the adhesive. Hot-melt viscosity stability is also a highly desired feature because viscosity changes are minimized making the hot-melt process more robust and reducing waste during production. Having such attributes, the adhesives of the present invention may be applied to a desired substrate by any method known in the art and include, without limitation, roll coating, slot coating, swirl spraying, spraying.

SUMMARY OF THE INVENTION

The novel block copolymer of the present invention comprises at least one polymeric block of monoalkenyl arene and at least one polymeric block of myrcene. These block copolymers can be represented by the formulae SM, SMS, S-M-(S-M)$_m$-S and (S-M)$_n$X where S represents a polymeric monoalkenyl arene block, M represents a polymeric myrcene block, m represents an integer ranging from 1 to 10, n represents an integer ranging from 1 to 30, and X represents the residue of a coupling agent. When one or more S blocks are present they can be the same or different. Adhesive compositions comprising the block copolymers of the invention display a remarkable low hot-melt viscosity compared to styrene-isoprene-styrene (SIS) block copolymers of similar molecular weight. Further, the novel block copolymer also shows remarkable stability under hot-melt conditions for a longer period of time than SIS block copolymers. The polymerized monoalkenyl arene content is from about 10 to about 50 wt. % with the remainder being polymerized myrcene, and having a melt flow rate of >50 g/10 min. at 200° C., under 5 kg weight, according to ASTM D1238, and preferably >100 g/10 min. at 200° C., under 5 kg weight, and more preferably >150 g/10 min. at 200° C., under 5 kg weight. These adhesives have utility in typical adhesive markets such as tapes, labels and printing plates, construction and hygiene.

In one preferred embodiment the block copolymer of the present invention is a composition comprising a SM diblock copolymer.

In another preferred embodiment the block copolymer of the present invention is a composition comprising a linear SMS triblock copolymer.

In another preferred embodiment the block copolymer of the present invention is a composition comprising a linear SMSMS pentablock copolymer.

In another preferred embodiment the block copolymer of the present invention is a composition comprising coupled, radial (S-M)$_2$X, (S-M)$_3$X, or (S-M)$_4$X block copolymers.

In another preferred embodiment the block copolymer of the present invention is a composition comprising radial, coupled (S-M-S')$_2$X, (S-M-S')$_3$X, or (S-M-S')$_4$X block copolymers.

In the broadest sense, the present invention also relates to an adhesive composition comprising: 100 parts by weight of a block copolymer of monoalkenyl arene and myrcene; from about 30 to 250 parts by weight of a tackifier, based on 100 parts of said block copolymer; from about 0 to 80 parts by weight of a plasticizer, based on 100 parts of said block copolymer; and from about 0.1 to 3 parts by weight of a stabilizer, based on 100 parts of said block copolymer.

All ranges set forth in the specification and claims include not only the end point of the ranges, but also every conceivable number between the end point of the ranges, since that is the very definition of a range. For example, ranges specifying the molecular weight, polystyrene content, vinyl content, coupling efficiency, etc., are intended to include this definition of a range.

BRIEF DESCRIPTION OF THE DRAWINGS

FIG. 1E is a DMA curve of the block copolymer SMS3. Three parameters are indicated on the graphs: 1) value of rubber glass transition temperature and peak height—2) value of elastic modulus at 25° C. in Pa—3) cross-over point temperature.

DETAILED DESCRIPTION OF THE INVENTION

Myrcene is an anionically polymerizable monomer and can be represented by the following general formula:

Myrcene has two isomers alpha and beta, wherein beta is more abundant and preferred for the present invention, both work. For the purposes of this invention we refer to myrcene as a conjugated diene. One skilled in the art would understand that this monomer actually has three alkenyl groups. However, two of those alkenyl groups reside adjacently in a conjugated fashion at one terminus of the monomer. It is this terminus having the conjugated diene that is active in anionic polymerizations.

The monoalkenyl arene is selected from the group of styrene and substituted styrenes such as methylstyrene, dimethylstyrene, alpha-methylstyrene, diphenyl ethylenes and the like, including mixtures of these, but preferably is styrene.

Block copolymers of monoalkenyl arene and myrcene have relatively low hot-melt viscosity compared to SIS polymers of similar molecular weight and are useful in hot-melt adhesives. An important disadvantage of prior hot-melt compositions, including styrene-isoprene-styrene block copolymers is that the hot-melt viscosity is not stable, but changes significantly during processing at the melt temperatures. With the present invention the change in hot-melt viscosity is not drastic.

The polymers also exhibit lower modulus compared to "comparable" SIS polymers. Lower plasticizer and tackifier can be used to achieve similar properties. A low modulus is required to obtain pressure sensitive adhesives. The polymer modulus can be lowered by using tackifiers and plasticizers. If the polymer modulus is lower, less co-ingredients might be used to get the required properties. Also some applications require very low modulus like adhesion on difficult substrates or recloseable packaging films.

The present invention relates to block copolymers having at least one polymeric block of monoalkenyl arene and at least one polymeric block of myrcene. The block copolymers of the present invention can be formed sequentially in diblock and/or triblock copolymer structures or coupled to form radial or star copolymers having 2 or more arms. While the diblock copolymer form is self evident having one polymeric monoalkenyl arene block and one polymeric myrcene block, the triblock copolymer comprises two terminal polymeric monoalkenyl arene blocks and one polymyrcene midblock. A radial or star block copolymer has more than 2 arms and each arm has a monoalkenyl arene block a myrcene block or both such that at least 2 terminal polymeric blocks of monoalkenyl arene are present in the average composition.

The monoalkenyl arene-myrcene di- and triblock products can be made by a sequential polymerization process in which the first step comprises polymerizing monoalkenyl arene, such as styrene, with an organolithium initiator until polymerization of the styrene is substantially complete. Then in a second step, myrcene is added to the reactor containing the polymer block of styrene resulting from the first step. Polymerization occurs spontaneously and is allowed to proceed until substantially all the myrcene has polymerized forming a diblock copolymer of styrene-myrcene. Thereafter, if a triblock copolymer is desired, an additional amount of styrene hydrocarbon can be added to the living styrene-myrcene diblock. Any amount of monoalkenyl arene may be added to form the third block. In a preferred embodiment the proportion of monoalkenyl arene in the third block is approximately equal to that in the first step. Again polymerization readily occurs and is allowed to continue until substantially all of the styrene monomer has polymerized. In this manner, a monoalkenyl arene-myrcene-monoalkenyl arene triblock copolymer is formed sequentially and is represented by the structure SMS.

Preparation of radial (branched—sometimes referred to as "star" block copolymer) polymers or linear coupled polymers requires a post-polymerization step called "coupling". In the formula, $(S-M)_nX$ for the radial block copolymer, S is a polymerized monoalkenyl arene, M is a polymerized myrcene block, n is an integer of from 1 to about 30, preferably from about 1 to about 5, and X is the remnant or residue of a coupling agent. The S-M arms of coupled block copolymers are formed by sequential polymerization as described above. Under suitable conditions, these diblock S-M copolymer arms couple together thus forming a triblock copolymer when "n" equals 2 (meaning 2 arms of diblock are coupled together) or a star radial type polymer when "n" is greater than 2. The coupling process is a statistical process and the resulting average value of n for the overall block copolymer composition represent the average number of arms of the radial structure in the block copolymer composition. For example a coupled block copolymer composition in which the target structure is a linear triblock (n=2) may also contain uncoupled diblock, three-armed radial structures (n=3), four-armed radial structures (n=4), etc. where the coupling conditions and efficiency of the coupling reactions will determine the distribution of structures within the resulting block copolymer composition. Radial copolymers having three or more arms typically result in a lower viscosity than sequentially produced triblock copolymers at equal molecular weight and equivalent relative amounts of S and M. Further, the S blocks can be much more uniform in molecular weight and composition in coupling procedure compared to those made in sequential polymerization.

The embodiments of this invention are not limited to symmetric, coupled block copolymers. The coupled arms may be identical resulting in symmetrical, coupled polymers or they may be different resulting in asymmetric, coupled polymers. In asymmetric embodiments some arms may contain no S block or no M block. Further, asymmetric, coupled block copolymers may contain arms in which the molecular weight of the S and M blocks and the composition of the S block may vary. In such asymmetric, coupled block copolymers the blocks can be represented as S, S', S", M, M', M" to indicate differences in molecular weight or in composition.

In a preferred embodiment the composition and molecular weight of the S blocks of the various coupled arms do not vary and a symmetric radial block copolymer results.

A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Pat. No. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is important in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material.

Anionic polymerization of conjugated diene hydrocarbons with lithium initiators is well known as described in U.S. Pat. No. 4,039,593 and Re. 27,145 which descriptions are incorporated herein by reference. Polymerization commences with monolithium, dilithium or polylithium initiators which build a living polymer backbone at each lithium site.

In general, the polymers useful in this invention may be prepared by contacting the monomer with an organoalkali metal compound in a suitable solvent at a temperature range of from −150° to 300° C., preferably at a temperature range of 0 to 100° C. Particularly effective polymerization initiators are organolithium compounds having the general formula RLi wherein R is an aliphatic, cycloaliphatic, or alkyl-substituted cyloaliphatic radical having from 1 to 20 carbon atoms. Suitable solvents include aliphatic hydrocarbons such as butane, pentane, hexane, heptanes or cyclohexane or cycloheptane, benzene, toluene and xylene and ethers such as tetrahydrofuran or diethylether.

The block copolymers used in the present invention have a coupling efficiency ("CE") of about 20 to 100 percent, including all points in-between. When the CE is less than 100% the remainder is uncoupled diblock. CE is defined as the proportion of polymer chain ends which were living, P—Li, at the time the coupling agent was added, that are linked via the residue of the coupling agent at the completion of the coupling reaction. In practice, GPC data is used to calculate the CE for a polymer product and is reported as a percentage of the total arms.

Monoalkenyl arenes useful in the present invention, include styrene, alpha-methylstyrene, methylstyrene, p-tert-butylstyrene, dimethylstyrene or mixtures of these, but is not limited to these. Of these, styrene is particularly preferred as it is easily available and its reactivity easily results in block copolymers. Styrene is the major monoalkenyl arene component in the block copolymers of the present invention. However, the monoalkenyl arene polymer block (S) may contain minor amounts of other monoalkenyl arene comonomers set forth above, up to 5 wt. % based on the total weight of the S block. The total S block content is at least 10 wt. %, based on the total weight of the block copolymer. For the purposes of this invention, styrene content means the content of the monoalkenyl arene in the block copolymer. The monoalkenyl arene content can be 10, 20, 30, 40, or 50 wt. %, and every point within in the range of 10-50 wt. % of the total weight of the monoalkenyl arene-myrcene block copolymer. The remainder is of course polymyrcene. In the case when the adhesive composition is a pressure sensitive adhesive the preferred monoalkenyl arene content is from 15 to 30 wt %. In the case when the adhesive composition is a hot-melt sprayable construction adhesive the preferred monoalkenyl arene content is from 25 to 50 wt. %.

U.S. Pat. No. 5,399,627 teaches that a small amount of butadiene at the end of the diene midblock is useful in that it enhances the coupling reaction in formation of the polymer, and results in a radial polymer with a higher number of branches. Separately, it is known that addition of a small amount of butadiene may enhance the cross-over from one block to another or may enhance the phase separation of two adjacent blocks. The amount of butadiene for this purpose need be added only in an amount sufficient to assure that the ends of all of the non-butadiene segments of the polymer chains are provided with at least one molecule of butadiene, though more butadiene can be added, usually about 1 to 3 wt. % of the total weight of the block copolymer, to make certain a sufficient amount is present for the reaction to proceed in a reasonable time frame. The coupled monoalkenyl arene-myrcene block copolymers of the present invention may be made using such a method to enhance coupling.

Figure 3:
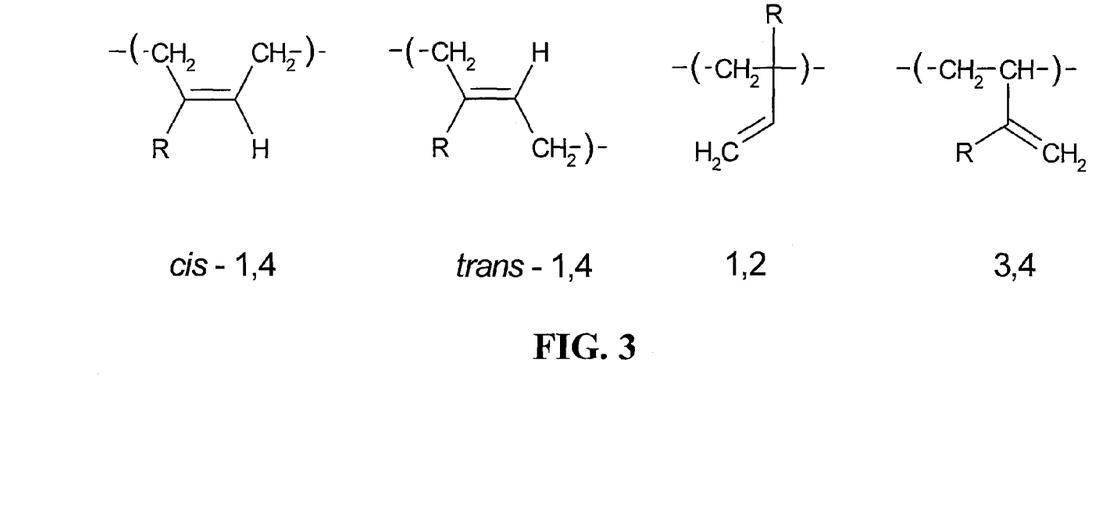
FIG. 3 is various polydiene microstructures for myrcene R=$CH_2CH_2CHC(CH_3)_2$.

The conjugated diene section of the monomers can be represented by $[C^1{=}C^2{-}C^3{=}C^4]$. Anionic polymerization of a conjugated diene can result in a polymer with all four of these carbons incorporated into the polymer backbone or, alternately, only two of these carbons ($C^1$-$C^2$ or $C^3$-$C^4$) incorporated into the polymer backbone. Anionic polymerization of myrcene can result in a polymer with 1,4-incorporated units, incorporating all four carbons in the polymer backbone, and 3,4-incorporated units, incorporating only two carbons in the polymer backbone. The portion of myrcene monomers for which only two carbons are incorporated by a 3,4-addition process contributes the larger group pendant to the polymer backbone. For the purposes of this invention the amount of myrcene monomer incorporated by a 3,4-addition process is said to be the vinyl content. FIG. 3 shows general polydiene microstructures (ref: H. L. Hsieh and R. P. Quirk, ANIONIC POLYMERIZATION principles and practical applications, New York, N.Y.: Marcel Dekker, 1996.), where for myrcene $R{=}CH_2CH_2CHC(CH_3)_2$ Those skilled in the art know that the polarity of the solvent used influences the ratio of 1,4- to 3,4 incorporation. Increase in polarity typically increases the 3,4-incorporation. Accordingly, the copolymers of the present invention can have a vinyl content from about 5 to about 80 mol. %.

As used herein, the term "molecular weights" refers to the apparent molecular weight in kg/mol of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of copolymers measured using GPC so calibrated are styrene equivalent molecular weights and are referred to as apparent molecular weights. The apparent molecular weights differ from the absolute or true molecular weight when the composition of the polymer eluting through the GPC columns is different in composition from polystyrene. However, comparison to well characterized model polymers allows conversion from apparent molecular weight to true or absolute molecular weight when necessary. The detection method used is preferably a combination of ultraviolet and refractive index detectors. The molecular weights expressed herein are measured at the peak of the GPC trace, and are commonly referred to as "peak molecular weights" (Mp).

Typical triblock copolymers must have sufficient molecular weight and polystyrene content to be useful for adhesive applications. The typical composition of the block copolymers of the invention is described by a polystyrene content between about 10 to about 50 wt. % and a polystyrene molecular wt. of 5-50 kg/mol, preferred 8-35 kg/mol, and most preferred 10-20 kg/mol. The molecular weight of the myrcene block is from about 10 to about 300 kg/mol, preferably 25-250 kg/mol, and most preferred 40-220 kg/mol. The molecular weight ranges expressed herein are to be considered descriptive of the polymyrcene block spanning between two polystyrene blocks. The skilled person would understand that when considering a diblock polymer which results from incomplete coupling, the molecular weight ranges of the polymyrcene block would be half of those specified here.

The SMS polymers are not tacky by themselves. Under the Dahlquist criterion, the requirement for a good pressure sensitive adhesive (i.e., an adhesive able to quickly form a bond under light pressure) is set as an adhesive with a 1-sec creep compliance greater than $1\times10^{-6}$ cm$^2$/dyne (at use temperature). Translated in storage modulus values and in SMI units this rule becomes: having an elastic modulus lower than $10^5$ Pa at use temperature. The elastic moduli of the inventive block copolymers are above this value and they therefore require to be formulated to exhibit suitable pressure sensitive adhesive properties.

Typical pressure sensitive adhesives or hot-melt adhesives contain, based on 100 parts of the styrene-myrcene block copolymer; about 30 to 250 parts of a suitable tackifier, based upon the 100 parts by weight of the block copolymer; about 0 to 80 parts of a suitable plasticizer, based upon the 100 parts by weight of the block copolymer; and about 0.1 to 3 parts by weight of a stabilizer, based upon the 100 parts by weight of the block copolymer.

Suitable tackifiers may be selected from the group of compatible $C_5$, $C_9$ or $C_5/C_9$ hydrocarbon resins, hydrogenated or partially hydrogenated $C_5$ or $C_9$ hydrocarbon resins, or styrenated $C_5$ or $C_9$ resins. Additionally, suitable tackifiers include terpenes, styrenated terpene resins, fully hydrogenated or partially hydrogenated terpene resins, rosin esters, rosin derivatives and mixtures thereof. Suitable commercially available tackifying resins of the present invention include Piccotac 1095-N, which is an aliphatic resin. Also suitable are the commercially available hydrocarbon tackifying resins of the Regalrez™ series such as Regalrez™ 1018, Regalrez™ 1085 or Regalrez™ 6108 and other resins sold under the trademarks "Regalite", "Escorez", "Wingtack", and "Arkon".

Adhesives compositions of the present invention may contain one or more plasticizers. Suitable plasticizers include plasticizing oils such as paraffinic or naphthenic in character. Products such as these are available from Shell Oil Company under the trademark SHELLFLEX®, also under the trademark CATENEX™ and EDELEX™ and ONDINA® and Drake oils. EDELEX® N956 is set forth in the Examples.

Although it is preferred to use a thermal stabilizer it is not required in the compositions of the present invention. Nevertheless, the use of one or more stabilizers, such as an antioxidant, is particularly suitable with hot-melt adhesive compositions. The antioxidants can be used either as a primary antioxidant such as hindered phenols or secondary antioxidants such as phosphite derivatives, or blends thereof. Acceptable stabilizers are Irganox® 565, 1010, 1076, or 1726 or Irgafos® 168, all by BASF, or Sumilizer® GS or T-PD from Sumitomo, or Ethanox 330 from Albemare.

The polymer blends of the present invention may be compounded further with other polymers, fillers, reinforcements, fire retardants, antiblocking agents, lubricants and other rubber and plastic compounding ingredients without departing from the scope of this invention.

The incorporation of inorganic fillers is important in the end use applications of the block copolymer. In particular, fillers are important to increase the mass and density of articles intended as vibration damping compositions. The nature and amount of the inorganic fillers present in the damping composition have an important effect on the extent of damping and on how vibration propagation is affected by temperature and frequency. Different morphologies of inorganic filler can be used. For example, fillers having a platelet form or those having a non-platelet form can be used. Examples of inorganic fillers in platelet form are mica, talc, flaked aluminum, flaked lead, and graphite. Mica has been found to be particularly effective. Various non-platelet fillers may be employed, for example, clay, calcium carbonate, barytes (barium sulfate), silica and iron powder. A synergistic effect can be realized between the platelet and non-platelet fillers. The total amount of filler employed can be high. As the amount increases the damping improves. The upper limit in filler content is determined by the required physical and mechanical properties of the final composition, such as, flexibility, tear strength and moldability.

In the present invention vibration damping compositions comprise 100 parts by weight of the block copolymer, from about 50 to about 100 parts by weight of a tackifier and an inorganic filler. As mentioned above the amount of filler can be as high as possible while maintaining desired physical and mechanical properties of the composition. Amounts of filler up to 800 parts by weight are useful. The preferred amount of filler is up to 300 parts by weight and the most preferred amount is up to 50 parts by weight.

EXAMPLES

Hypothetical Example 1

Using anionic polymerization grade solvents, monomers and lithium alkyl initiators and using standard anionic polymerization techniques, 4.5 kg of cyclohexane is heated to 60° C. in a 10 liter, water cooled reactor, and treated with 24 mL of sec-butyl lithium (s-BuLi; 0.3 M solution in cyclohexane). About 215 g of styrene monomer (S) is added to afford a first polymer block of about 30 kg/mol true molecular weight (MW). Initiation of polymerization will be noted by a change in color of the solution to red-orange and a modest increase in the temperature of the polymerization solution. After completion of polymerization of the styrene monomer, about 250 g of myrcene (M), is added to afford a living two block copolymer having a total true MW of about 65 kg/mol. Polymerization of myrcene will change the color of the solution to yellow. When myrcene polymerization is complete, about 35 g of styrene monomer is added to afford a total three block copolymer of about 70 kg/mol. true MW. The addition of styrene to the living polymerization solution induces a change in the color of the living polymerization solution to a red-orange color. When polymerization of the third block of the copolymer is complete, about 5 g of isoprene is added after which the coupling agent, 438 mg of tetramethoxysilane is added to the polymerization solution and the reaction is allowed to proceed at 60° C. for about 2 hours. Analysis of the polymer product by gel permeation chromatography will show that at least 80% of the polymer chains will have been coupled to form a mixture of a linear, pentablock copolymer, (S-M-S')$_2$—Si(OMe)$_2$, and related three- and four-armed coupled radial polymers, (S-M-S')$_3$—SiOMe and (S-M-S')$_4$—Si, respectively.

Example 1

Polymerization Procedure for Coupled SMS

Cyclohexane and styrene were purchased from Caldic. Butadiene was purchased from Gerling Holz and Co. Myrcene was purchased from Aldrich. Sec-butyllithium was purchased from Acros. Methyltrimethoxysilane (MTMS), used as the coupling agent, was purchased from Evonik Industries. Cyclohexane, styrene, butadiene and myrcene were purified by activated aluminum oxide and stored at 4° C. under a nitrogen atmosphere.

The polymerizations were all carried out according to the following procedure: The desired amount of solvent (cyclohexane) was added to the autoclave (10 L, water cooled), and heated to 50° C. Sec-butyllithium was added to the autoclave, followed by styrene dose 1. After polymerization of the styrene monomer (polystyrene 1), the molecular weight was measured using GPC and the residual dose of styrene monomer was added as needed to obtain the target molecular weight. After conversion of the second dose of styrene, myrcene monomer in cyclohexane (75 wt. %) was added to the reactor. After completion of the myrcene monomer addition, the mixture was allowed to react for another 20 minutes after which 6 g of butadiene was added. After that the coupling agent, MTMS, was added in three dosages with a total ratio of 0.45 mol MTMS/Li ions (MTMS/Li; mmol Li calculated based on Mp of polystyrene 1). After 1 hour of coupling time methanol was added. And the polymer was stabilized with Irganox 565. Dry polymer was obtained by steam coagulation finishing, followed by drying in an oven (50° C.).

TABLE 1

Polymerization details of SMS1, SMS2 and SMS3

| Polymers | | SMS1 | SMS2 | SMS3 |
|---|---|---|---|---|
| Cyclohexane | kg | 4.67 | 4.67 | 4.67 |
| sec-BuLi | mL | 15 | 19 | 19 |
| Styrene dose 1 | g | 73.5 | 85.6 | 86.5 |
| Styrene dose 2 | g | 11.0 | — | 18.4 |
| Myrcene/CyC6 | g | 602.3 | 472.8 | 582.6 |
| Butadiene | g | 6.5 | 6.0 | 6.0 |
| MTMS | mg | 448 | 465 | 458 |
| MeOH | mL | 0.2 | 0.3 | 0.23 |
| Irg 565 | wt. % | 0.1 | 0.1 | 0.1 |
| Mp Polystyrene 1 | kg/mol | 10.1 | 11.3 | 11.6 |
| Mp Polystyrene 1.2 | kg/mol | 11.3 | — | 13.9 |
| Mp S-M diblock copolymer (apparent) | kg/mol | 99.8 | 69.5 | 90.8 |
| Mp (S-M)$_2$X (apparent) | kg/mol | 199 | 144 | 182 |
| CE | % | 79.4 | 80.5 | 78.3 |

Polymer Testing

A typical SIS (styrene-isoprene-styrene) block copolymer and a typical S-I/B-S (styrene-isoprene/butadiene-styrene) block copolymer were tested against the styrene-myrcene-styrene coupled triblock copolymers of the present invention SMS1, SMS2 and SMS3.

The molecular characteristics of the various polymers can be found in Table 2.

TABLE 2

Polymer molecular characteristics

| Product | | SIS | S-I/B-S | SMS1 | SMS2 | SMS3 |
|---|---|---|---|---|---|---|
| Mp Polystyrene | kg/mol | 11.1 | 11 | 11.3 | 11.3 | 13.9 |
| Mp (S-M)$_2$X (apparent) | kg/mol | 178 | 183 | 199 | 144 | 182 |
| PSC-NMR | w % | 18.4 | 18.8 | 15 | 20.5 | 19 |
| CE | % | 100 | 73 | 79.4 | 80.5 | 78.3 |

The Melt Flow Rate (MFR, 200° C., 5 kg) and tensile strength (TS) were determined on the neat polymer samples. The TS was performed on solvent cast films. The viscoelastic properties were measured by Dynamic Mechanical Analysis (DMA) on a Rheometrics RDAII rheometer. The frequency chosen was 10 rad/s and the temperature ranged from −100 to +200° C., with an increase of 5° C./min. The DMA results are shown in FIG. 1.

TABLE 3

MFR and TS of the different polymers

| | | SMS1 | SMS2 | SMS3 | SIS | S-I/B-S |
|---|---|---|---|---|---|---|
| MFR (200° C./5 kg) | g/10 min. | >400 | 355 | 159 | 9 | 13 |
| TS, cast film | MPa | 1.4 | 1.9 | 2.6 | 9 | 8.3 |
| E 300% elongation | MPa | 0.5 | 1.7 | 1.4 | 2.0 | 2.0 |
| Elongation at break | % | 730 | 380 | 600 | 1150 | 1200 |

As can be seen from Table 3, the SMS polymers flow very well, with MFR above 150 g/10 min. For MFR values above about 300 g/10 min., the accuracy is less reliable, resulting in no real distinction made between SMS1 and SMS2.

The TS and modulus of SMS block copolymers are low. The elongation at break is lower than for SIS and S-I/B-S polymers, of comparable molecular weight, which is due to the more compact rubber structure (dangling chains). SMS1 having the highest peak Mw, shows also the highest elongation at break amongst the SMS block copolymers. The lower mechanical performance of SMS polymers is not a problem for most ASC applications.

The main viscoelastic parameters as measured by DMA have been summarized in Table 4.

TABLE 4

DMA parameters of the various polymers

|  |  | SMS1 | SMS2 | SMS3 | SIS | S-I/B-S |
|---|---|---|---|---|---|---|
| Tg | °C. | −54 | −53 | −54 | −50 | −65 |
| G' at plateau | MPa | 0.22 | 0.46 | 0.43 | 1.05 | 1.70 |
| X over point | °C. | 118 | 126 | 150-190 | 145 | 142 |

The SMS polymers are very soft polymers per Table 4, which confirms their applicability to adhesive applications. Comparing SIS and S-I/B-S with the SMS block copolymers, the following observations about SMS block copolymers can be made:

The Tg is slightly lower than SIS, measured at the same conditions (−54° C. vs. −50° C.).

The tan delta peak is broader than for SIS polymers and is also quite high. These two latter properties suggest that these polymers should have good damping performance (tan delta peak height is 2.9 for SMS1).

SMS polymers exhibit a very low elastic modulus (at similar PSC content it is about half the one of SIS polymer), and it remains very flat over a broad temperature range. This is the sign of stable properties over a relatively large temperature range. The cross-over point is significantly lower than SIS or S-I/B-S with similar PS block size. This is another proof that these polymers can be processed at lower temperature than comparable SIS polymers.

Figure 1A:
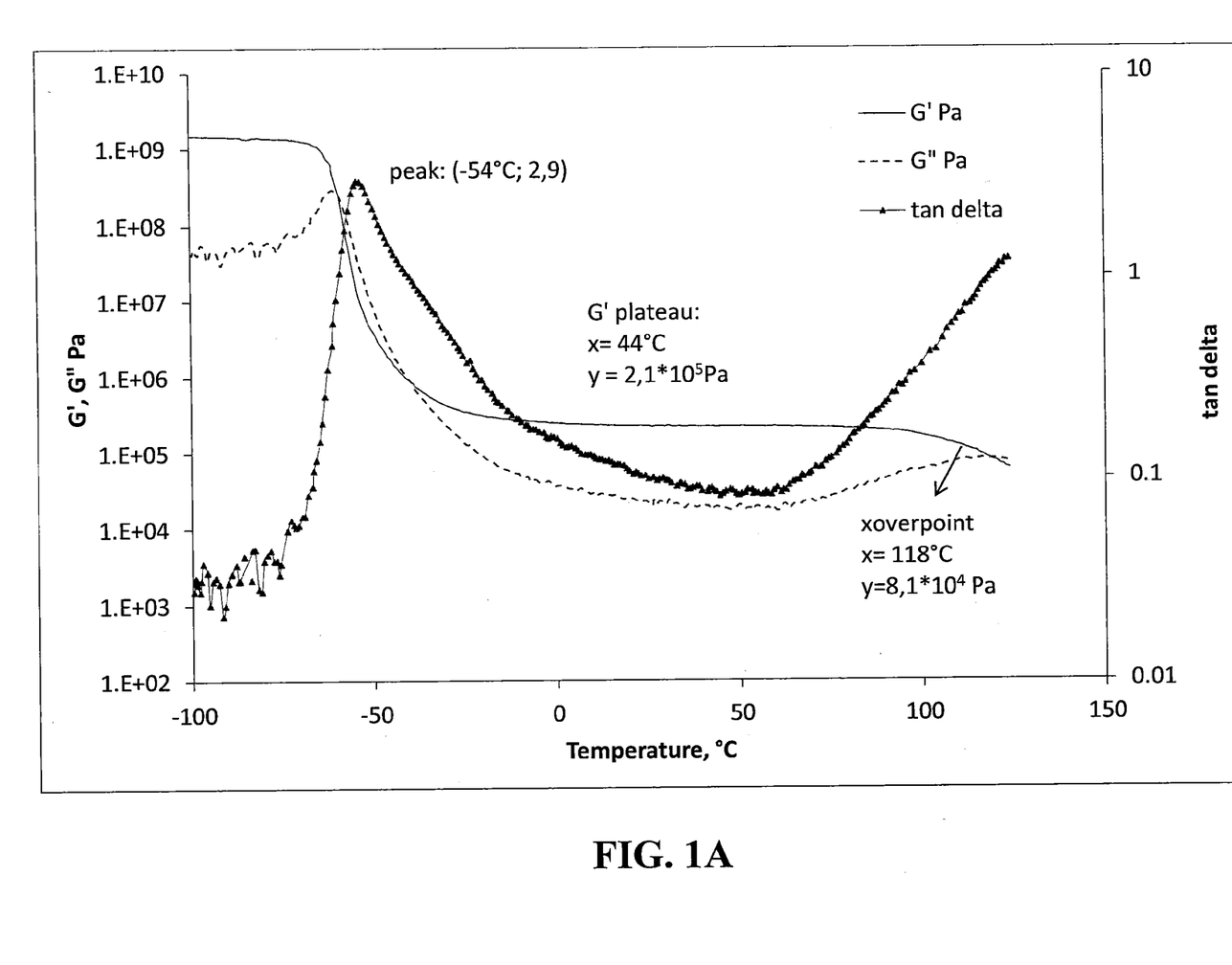
FIG. 1A is a DMA curve of block copolymer SIS.
Figure 1B:
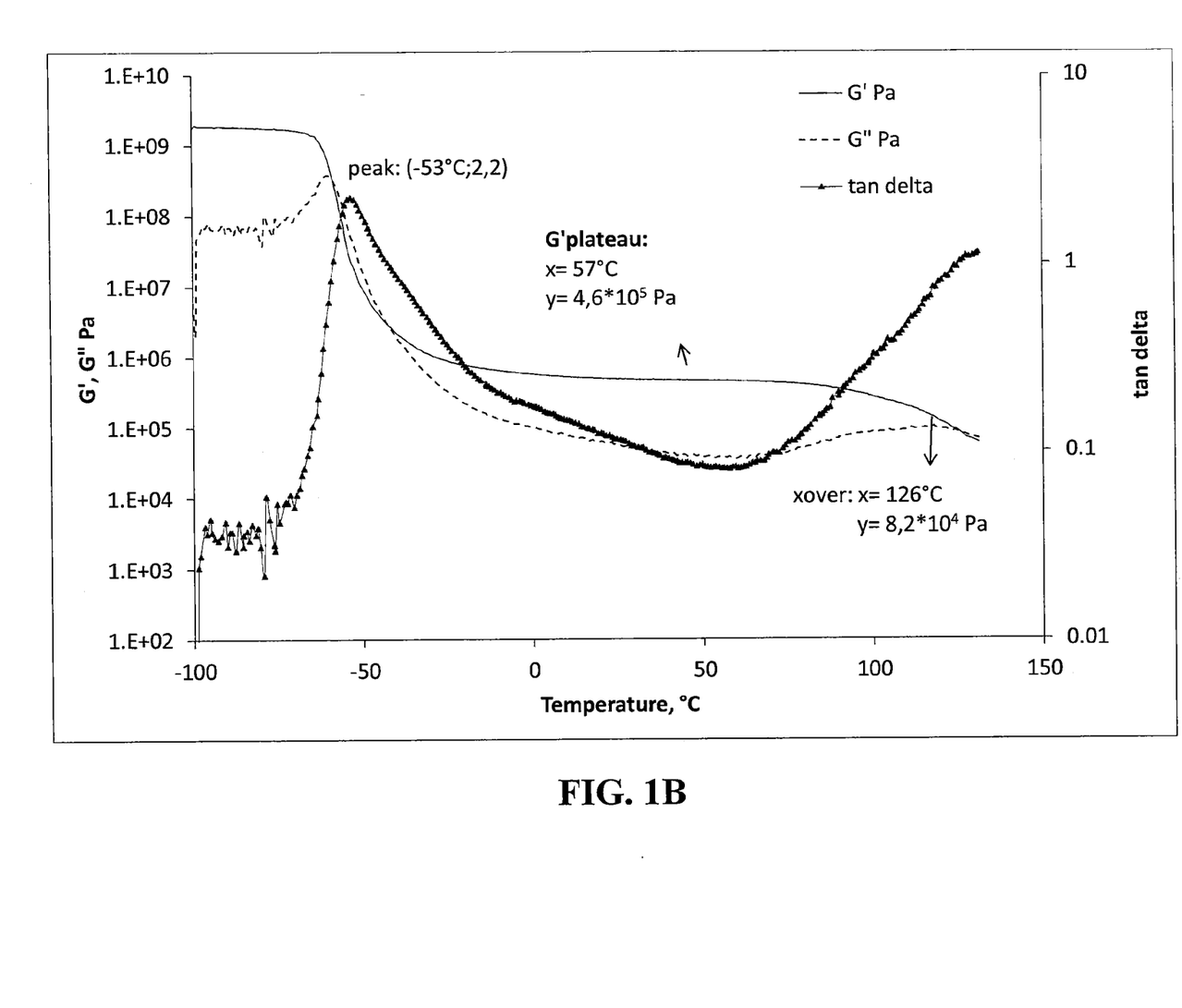
FIG. 1B is a DMA curve of block copolymer S-I/B-S.
Figure 1C:
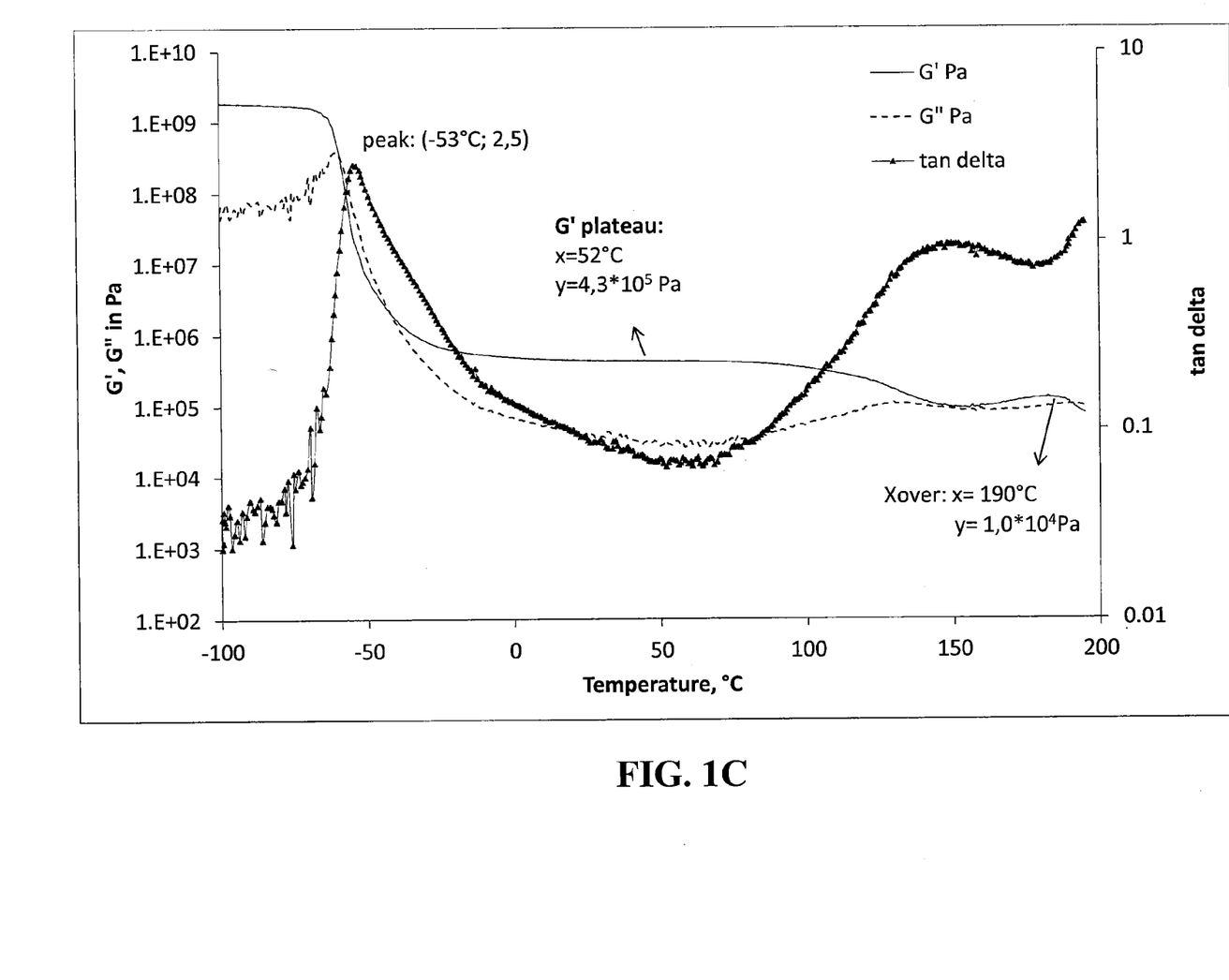
FIG. 1C is a DMA curve of the block copolymer SMS1.
Figure 1D:
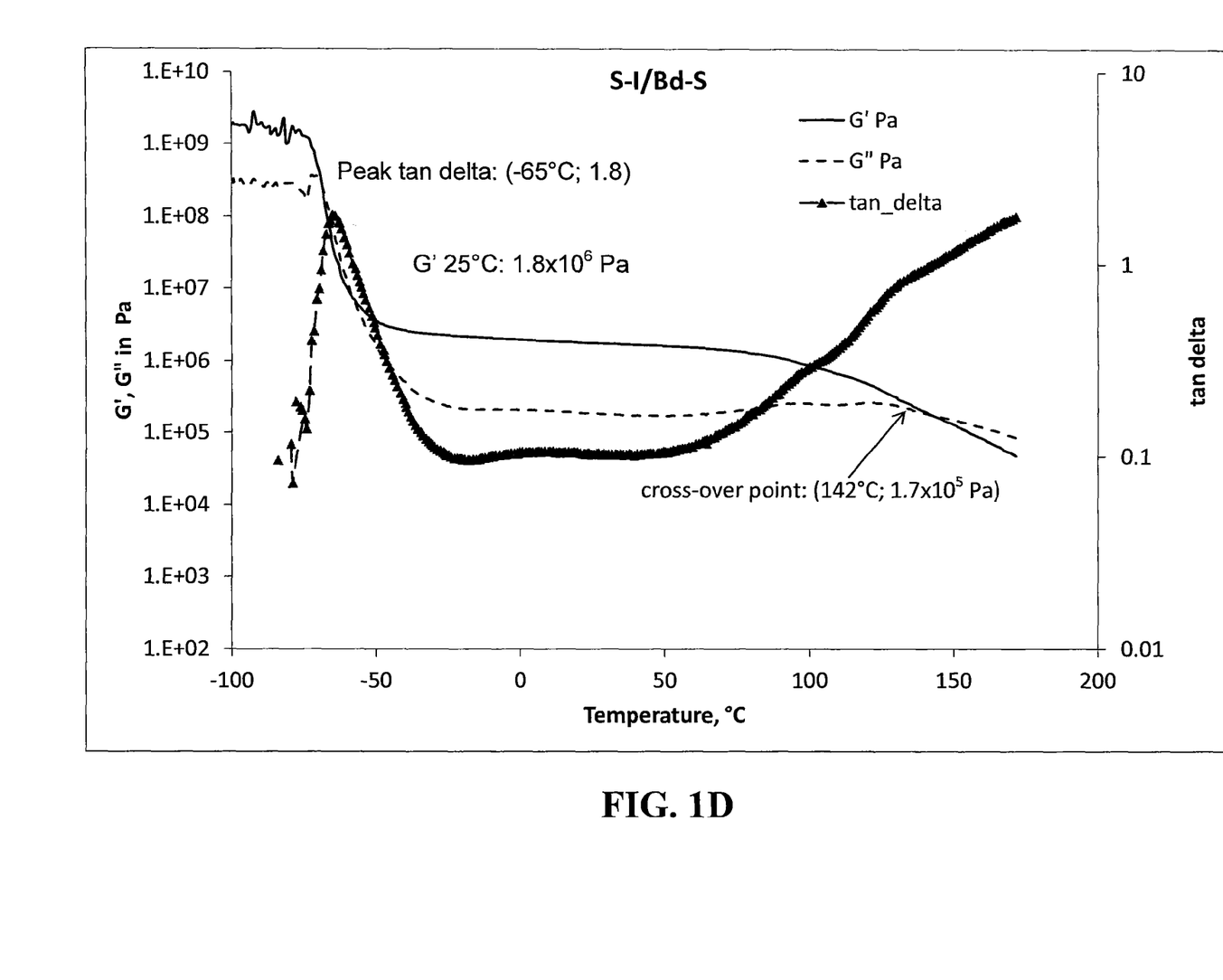
FIG. 1D is a DMA curve of the block copolymer of SMS2.
Figure 1E:
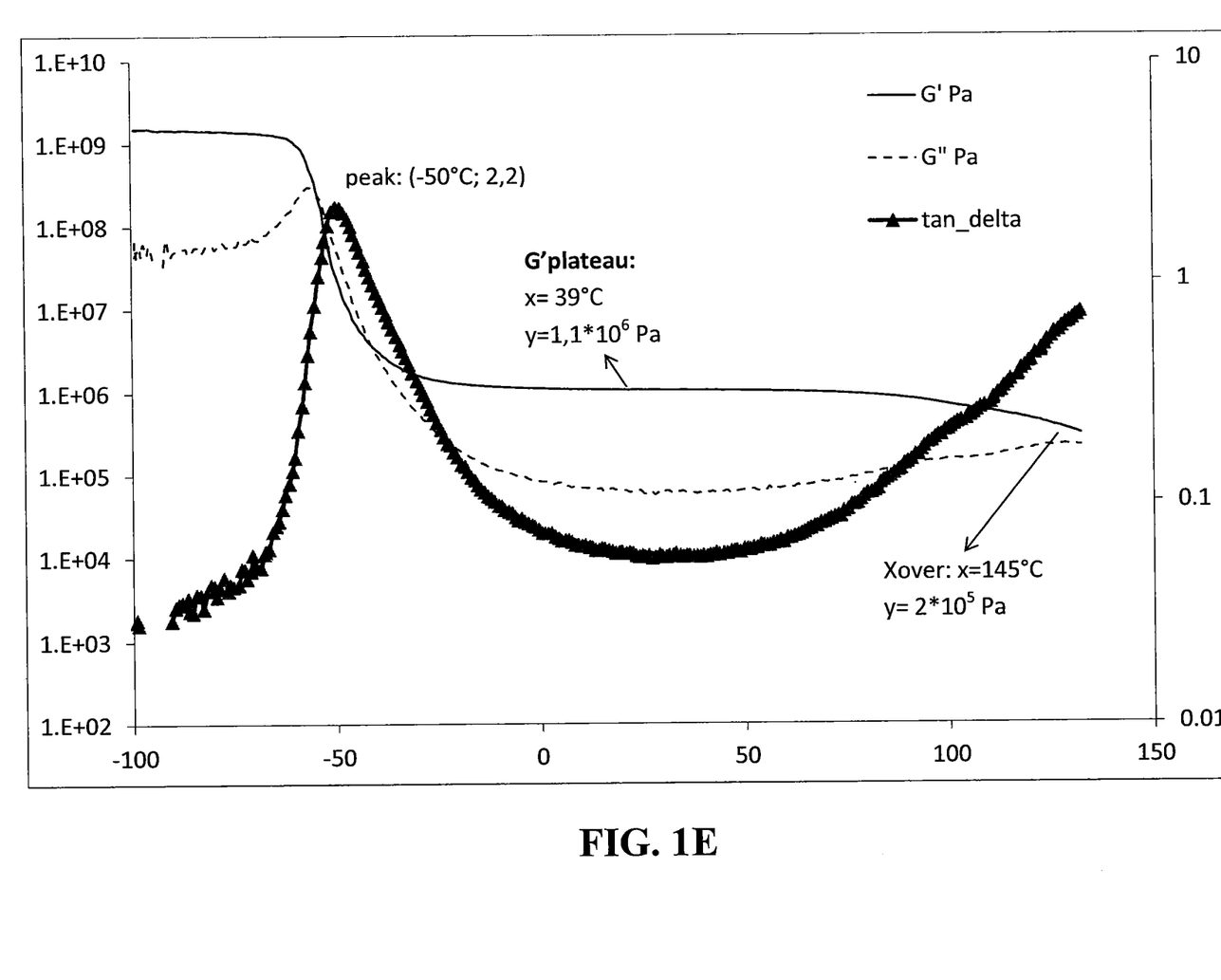

As can be seen in FIGS. 1C, 1D and 1E the elastic modulus at 25° C. is $2.2 \times 10^5$ Pa, $4.9 \times 10^5$ Pa and $4.4 \times 10^5$ Pa for SMS1, SMS2 and SMS3 respectively, so above the Dahlquist criterion (although being very low). These polymers therefore require to be formulated to get sufficient PSA properties. Unformulated SMS1 was coated at 22±2 g/m². No peel adhesion to stainless steel could be measured. Because of the lower modulus compared to SIS (see FIG. 1A) and S-I/B-S (see FIG. 1B), SMS polymers might however require less tackifier to get suitable properties.

Example 2

Adhesive Compositions and Properties

All block copolymers were compared using a typical adhesive tape formulation:

| Block Copolymer | 100 phr |
|---|---|
| Tackifying Resin | 125 phr |
| Oil | 25 phr |
| Antioxidant | 1 phr |

TABLE 5

Adhesive Compositions

| Ingredient | F1 | F2 | F3 | F4 | F5 | F6 | F/7 | F/8 |
|---|---|---|---|---|---|---|---|---|
| SMS1 | 100 | 100 | — | — | — | — | — | — |
| SMS2 | — | — | — | — | 100 | 100 | — | — |
| SMS3 | — | — | — | — | — | — | 100 | 100 |
| SIS | — | — | 100 | — | — | — | — | — |
| S-I/B-S | — | — | — | 100 | — | — | — | — |
| Piccotac 1095E | 125 | — | 125 | — | 125 | — | 125 | — |
| Piccotac 8090 | — | 125 | — | 125 | — | 125 | — | 125 |
| Edelex N956 | 25 | 25 | 25 | 25 | 25 | 25 | 25 | 25 |
| Irganox 1010 | 1 | 1 | 1 | 1 | 1 | 1 | 1 | 1 |

The full list of the non-block copolymer ingredients can be found in Table 6.

TABLE 6

List of the co-ingredients

| Name | Producer | Comments |
|---|---|---|
| Piccotac 1095-N resin | Eastman Chemical | $C_5$ hydrocarbon tackifying resin |
| Piccotac 8090 resin | Eastman Chemical | $C_5/C_9$ hydrocarbon tackifying resin |
| Edelex N956 oil | Shell Oil Company | Mineral oil |
| Irganox 1010 antioxidant | BASF | Phenolic primary antioxidant |

Figure 2:
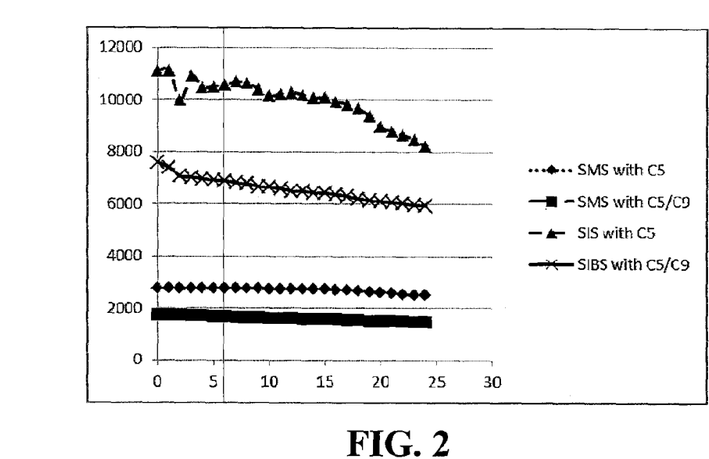
FIG. 2 is a graph of the hot-melt viscosity stability versus time for SMS1 with $C_5$ tackifier, SMS1 with $C_5/C_9$ tackifier, SIS with $C_5$ tackifier and SIBS with $C_5/C_9$ tackifier.

F1 to F4 were hot-melt compounded at a temperature of 150° C. The hot-melt stability of the viscosity (in mPas) of F1, F2, F3 and F4 versus time (24 hours) were graphed together and illustrated in FIG. 2. The hot-melt viscosity was measured with a Brookfield RVDVII viscometer. As can be seen, F1 and F2 show a flat, lower viscosity over 24 hours, than F3 and F4 which show a higher viscosity and it drops significantly over 24 hours indicating its stability is not as robust as the present invention of F1 and F2.

Adhesive Testing

The following tests in Table 7 were performed on the adhesive compositions in Table 5.

TABLE 7

SMS1, SIS and S-I/B-S polymers were compared in a hot-melt adhesive formulation

| Rolling Ball Tack (RBT) | PSTC 6 |
|---|---|
| Loop Tack (LT) on stainless steel | FTM 9 |
| Peel Adhesion (PA) 180° on stainless steel | FTM 1 |
| Holding Power (HP), RT, 12.5 × 25 mm² on stainless steel | FTM 8 |
| Shear Adhesion Failure Temperature (SAFT), 500 g, ° C. | Proprietary method |

The adhesive formulation samples were hot-melt compounded on the mini Z-blade at a temperature of 150° C. They were then solvent coated with a Braive coater directly on PET (polyethylene terephthalate) film at a coating thickness of 22±2 g/m².

Table 8 shows the adhesive properties and hot-melt viscosity of F1 to F4. The hot-melt viscosity was recorded for 24 hr using a Brookfield viscometer set at 160° C. The SMS polymer exhibits excellent aggressive tack which is shown by the low rolling ball tack values. Other adhesion properties are comparable with SIS. The temperature resistance expressed by the SAFT is also comparable or better, despite the fact that the polymer cross-over point is lower. This is a sign of better hot-melt stability of the polymer. Finally, the hot-melt viscosity is nearly 5 times lower than standard SIS and S-I/B-S with comparable adhesion/cohesion properties. This is very valuable. The hot-melt viscosity is not only significantly lower but it is also better stable with time at high temperature. This is an unexpected feature of SMS polymers.

TABLE 8

Adhesive properties from hot-melt compounded samples

|  | F1 | F2 | F3 | F4 |
|---|---|---|---|---|
| Polymer | SMS1 | SMS1 | SIS | S-I/B-S |
| Tackifier | C5 | C5/C9 | C5 | C5/C9 |
| RBT, cm | 7 | 8 | 19 | 10 |
| LT, N/25 mm | 16* (22) | 14 (19) | 17 (25) | 15 (24) |
| PA 180, N/25 mm | 26 | 19 | 27 | 31 |
| HP 2 kg on SS, h | 1.6 | 2.5 | 2.3 | 2.7 |
| SAFT, ° C. | 81 | 72 | 76 | 70 |
| Hot-melt viscosity 160° C., mPas | | | | |
| Initial | 2760 | 1735 | 11125 | 7580 |
| After 24 h | 2505 | 1495 | 8200 | 6630 |
| Retention, % | 91 | 86 | 74 | 78 |

*is average value - ( ): maximum value

The viscosity is lower with $C_5/C_9$ resin than with $C_5$ resin because $C_5/C_9$ resin is partly compatible with the polystyrene endblock. This very low viscosity should allow making or coating adhesives at a lower temperature than what is currently used for SIS or S-I/B-S based formulations. This results in energy savings and allows the use of SMS polymers of the present invention to easily coat on heat sensitive substrates. It also allows for formulating higher polymer content formulations which would still be hot-melt processable.

SMS2, SMS3, SIS and S-I/B-S polymers were solvent compounded and solvent coated with a Braive coater directly on PET (polyethylene terephthalate) film at a coating thickness of 22±2 g/m². The adhesive properties of the obtained coatings can be seen in Table 9.

TABLE 9 adhesive properties from solvent compounded samples

|  | F3 | F4 | F5 | F6 | F7 | F8 |
|---|---|---|---|---|---|---|
| Polymer | SIS | S-I/B-S | SMS2 | SMS2 | SMS3 | SMS3 |
| tackifier | C5 | C5/C9 | C5 | C5/C9 | C5 | C5/C9 |
| RBT, cm | 22 | 17 | 29 | 9 | 3 | 29 |
| LT, N/25 mm | 12* (20) | 11 (18) | 6 (9) | 5 (8) | 7 (12) | 6 (11) |
| PA 180, N/25 mm | 18 | 16 | 13 | 12.5 | 14 | 12.5 |
| HP 2 kg on SS, h | >120 | >120 | >120 | >120 | >120 | >120 |
| SAFT, ° C. | 110 | 90 | 88 | 84 | 101 | 88 |

*is average value
( ): maximum value

Again SMS polymers show lower RBT than comparable SIS and S-I/B-S polymers. The adhesion values are a little bit lower but they also exhibit higher PS content. As expected, formulations containing $C_5$ resins have better SAFT (see Table 9) because the resin does not soften the polystyrene blocks. SMS2, being the smallest molecule, exhibits the lowest SAFT (shear adhesion failure test) results.

As we can see from Table 9, formulation exhibiting good pressure sensitive adhesive performance and superior tack can be obtained with SMS polymers.

Thus it is apparent that there has been provided, in accordance with the invention, both a styrenic-myrcene block copolymer resin and an adhesive composition incorporating the resin that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A block copolymer composition comprising at least one polymeric block of monoalkenyl arene and at least one polymeric block of myrcene, said composition having 50 wt. % or less monoalkenyl arene and a melt flow rate of greater than about 50 grams/10 min. at 200° C. and 5 kg weight according to ASTM D1238, said at least one block of monoalkenyl arene having a molecular weight of 10-20 kg/mol., and said at least one block of myrcene having a molecular weight of 40-220 kg/mol., said block copolymer composition has the general structure $(S-M-S')_nX$ or $(S-M)_n$ X where S and S' are polymeric blocks of monoalkenyl arene, M is a polymeric block of myrcene, and n is an integer from 1 to about 5, and X is the residue of a coupling agent, said at least one polymeric block of monoalkenyl arene contains at least 95 wt. % styrene with up to 5 wt. % of alpha-methylstyrene, methylstyrene, p-tertbutylstyrene, dimethylstyrene, or mixtures of these, based on the total weight of the monoalkenyl arene in said block copolymer, wherein said block copolymer composition has a viscosity retention greater than 80% for 24 hours, at 160° C. and a vinyl content ranging from about 5 mol. % to 50 mol. %.

2. An adhesive composition comprising 100 parts by weight of a block copolymer of two end blocks of monoalkenyl arene and a mid-block of myrcene having a vinyl content ranging from about 5 mol. % to 50 mol. %; from about 30 to 250 parts by weight of a tackifier, based on 100 parts of said block copolymer; from about 0.1 to 80 parts by weight of a plasticizer, based on 100 parts of said block copolymer; and from about 0.1 to 3 parts by weight of a stabilizer, based on 100 parts of said block copolymer, the molecular weight of each monoalkenyl arene block is from about 10 to 20 kg/mol., the molecular weight of said polymyrcene block is from 40 to 220 kg/mol., said tackifier is selected from the group of $C_5$ hydrocarbon resins, hydrogenated $C_5$ hydrocarbon resins, styrenated $C_5$ resins, $C_9$ hydrocarbon resins, hydrogenated $C_9$ hydrocarbon resins, styrenated $C_9$ resins, $C_5/C_9$ hydrocarbon resins, a modified $C_5$, $C_9$, or $C_5/C_9$ resin, terpenes, rosin ester, rosin derivatives or a mixture of two or more of these, said plasticizer is selected from the group of mineral or naphthenic oil, said block copolymer contains at least 50 wt. % of said myrcene, and said monoalkenyl arene is at least 10 wt. %, based on the total weight of said block copolymer.

3. A process for producing a coupled block copolymer of monoalkenyl arene and myrcene, comprising introducing into a reactor styrene and an organolithium initiator; polymerizing said monoalkenyl arene to form a polymeric block of monoalkenyl arene; introducing myrcene into said reactor; continuing polymerization of said myrcene to form a polymeric diblock of styrene and myrcene or introducing additional styrene to the polymeric diblock of styrene and myrcene to form a triblock of styrene and myrcene; introducing a coupling agent into said reactor and coupling said diblock or triblock copolymer of styrene and myrcene, forming $(S-M-S)_nX$ or $(S-M)_nX$ where S is polymeric blocks of styrene, M is a polymeric block of myrcene, and n is an integer from 1 to about 5, and X is the residue of a coupling agent, wherein said polystyrene content is 50 wt. % or less, and the molecular weight of a styrene block is 10-20 kg/mol. and the molecular weight of said myrcene block is 40-220 kg/mol., further comprising the step of introducing an amount of butadiene sufficient to introduce at least one molecule of butadiene per myrcene block between the steps of polymerizing said myrcene and introducing a coupling agent, and wherein the block copolymer has a vinyl content of about 5 mol. % to about 50 mol. %.

4. The process of claim 3, wherein the amount of butadiene is up to 3 wt. %, based on the total weight of the coupled block copolymer.

* * * * *